United States Patent

Fujii et al.

[11] Patent Number: 5,539,050
[45] Date of Patent: Jul. 23, 1996

[54] POLYPHENYLENE ETHER THERMOPLASTIC RESIN COMPOSITION

[75] Inventors: Takeshi Fujii, Sodegaura; Yuji Saga, Ichihara; Mitsuyoshi Odashima, Ichihara; Katsunari Inagaki, Ichihara, all of Japan

[73] Assignee: Sumitomo Chemical Company, Limited, Osaka, Japan

[21] Appl. No.: 328,327

[22] Filed: Oct. 24, 1994

[30] Foreign Application Priority Data

Oct. 27, 1993 [JP] Japan .................. 5-268978

[51] Int. Cl.$^6$ ............... C08L 23/16; C08L 71/12
[52] U.S. Cl. ................ 525/68; 525/92 D
[58] Field of Search ................ 525/68, 92 D

[56] References Cited

U.S. PATENT DOCUMENTS

| | | | |
|---|---|---|---|
| 3,943,191 | 3/1976 | Cooper et al. | 525/68 |
| 3,981,814 | 9/1976 | Nikawitz | 252/107 |
| 4,101,505 | 7/1978 | Cooper et al. | 524/141 |
| 4,127,558 | 11/1978 | Cooper et al. | 524/141 |
| 5,071,911 | 12/1991 | Furuta et al. | 525/68 |
| 5,182,151 | 1/1993 | Furuta et al. | 525/68 |
| 5,183,849 | 2/1993 | Yamaguchi et al. | 525/68 |

FOREIGN PATENT DOCUMENTS

| | | |
|---|---|---|
| 0356194 | 2/1990 | European Pat. Off. . |
| 0379286 | 7/1990 | European Pat. Off. . |
| 0442180 | 8/1991 | European Pat. Off. . |
| 3035643 | 5/1982 | Germany . |
| 3206637 | 11/1982 | Germany . |
| 61-271342 | 12/1986 | Japan . |
| 62-280209 | 12/1987 | Japan . |
| 1312465 | 4/1973 | United Kingdom . |

*Primary Examiner*—Thomas Hamilton, III
*Attorney, Agent, or Firm*—Watson Cole Stevens Davis

[57] ABSTRACT

A polyphenylene ether thermoplastic resin composition excellent in impact resistance, particularly surface impact strength, which comprises a blend of: 95 to 5 parts by weight of a mixture of:

(A) 1 to 100% by weight of a polyphenylene ether resin and (B) 0 to 99% by weight of an alkenyl aromatic resin, with (C) 5 to 95 parts by weight of a graft copolymer obtained by graft-copolymerizing (a) an alkenyl aromatic compound and, if necessary, (b) other unsaturated monomer onto (c) an ethylene-α-olefin copolymer rubber having a ratio (Q value) of weight average molecular weight/number average molecular weight as measured by GPC of 4.0 or less and having a Mooney viscosity at 121° C. of 40 or more, in which graft copolymer the weight ratio of (a) the alkenyl aromatic compound/(b) the other unsaturated monomer/(c) the ethylene-α-olefin copolymer rubber is 20–80/0–18.4/80–20 (the total of the component (a) and the component (c) is 100 parts by weight) and the weight ratio of the component (b)/(the component (a)+the component (b)) is 0.23 or less.

6 Claims, No Drawings

POLYPHENYLENE ETHER THERMOPLASTIC RESIN COMPOSITION

BACKGROUND OF THE INVENTION

This invention relates to a polyphenylene ether thermoplastic resin composition which is excellent in impact resistance, particularly surface impact strength.

Polyphenylene ether resin is one of the engineering plastics having excellent properties such as heat resistance, mechanical properties and the like.

Said polyphenylene ether resins have already been disclosed in prior art references, for example, U.S. Pat. Nos. 3,306,874; 3,306,875 and 3,573,257, etc.

Polyphenylene ether resins have such disadvantages that their moldability is poor and their impact resistance is low though they have excellent properties as mentioned above. In order to overcome such disadvantages, various methods have been proposed. For making moldability better, there is known a method comprising blending with the polyphenylene ether resin a styrene homopolymer which is compatible with the polyphenylene ether resin, and for improving the impact resistance, there is known a method comprising blending and dispersing a rubber therein. In particular, the rubber-modified styrene copolymers are effective in that moldability and impact resistance can be simultaneously improved. Particularly, polybutadiene rubber on which styrene has been graft-copolymerized (referred to hereinafter as BR-HIPS) is generally used. For example, U.S. Pat No. 3,383,435 discloses polyphenylene ether resin/BR-HIPS.

In particular, in order to improve impact resistance, for example, JP-B-47-32,731 discloses blending a polybutadiene rubber with a polyphenylene ether resin. This is also disclosed in JP-A-46-2,345, JP-A-48-74,552, JP-A-49-85,144, U.S. Pat Nos. 3,835,200 and 3,994,856.

However, polybutadiene (referred to hereinafter as BR) has unsaturations in the polymer main chain, and hence, is instable against heat and light. As a result, when a polybutadiene rubber is blended with a polyphenylene ether resin, the heat stability, light stability and weather resistance of the resulting resin composition are unsatisfactory in practice.

Moreover, U.S. Pat. No. 3,361,851 and JP-B-42-7,069 propose blending a polyolefin with a polyphenylene ether resin to improve the moldability of the polyphenylene ether resin and also improve the impact resistance of a molded article obtained therefrom. Polyolefin is superior to BR in heat stability and light stability. However, polyolefin is essentially inferior in compatibility with the polyphenylene ether resin, and hence, for example, when at least 5% by weight of a polyolefin is blended with the polyphenylene ether resin, phase separation is clearly observed in the resin composition obtained. When the amount of polyolefin blended exceeds 10% by weight, delamination is caused. Accordingly, when a polyolefin is merely simply blended with the polyphenylene ether resin, the appearance of the molded article obtained is inferior and the impact resistance thereof is not improved.

JP-A-49-75,663 discloses blending, with a polyphenylene ether resin, a polyolefin graft-copolymerized with styrene for improving its compatibility with the polyphenylene ether resin, to improve the moldability of the resulting resin composition while retaining the practical mechanical strength of the polyphenylene ether resin. The polyolefin disclosed therein is substantially crystalline.

As another proposal for improving the impact resistance of a polyphenylene ether resin, for example, U.S. Pat No. 3,920,770 discloses a composition in which a substantially non-crystalline ethylene-propylene-non-conjugated diene copolymer rubber (referred to hereinafter as EPDM) is blended as a kind of polyolefin with the polyphenylene ether resin. With EPDM alone, its compatibility with the polyphenylene ether resin is insufficient, phase separation is caused and the impact strength is also insufficient, so that it cannot be used in practice.

Many proposals have been made according to which styrene is graft-copolymerized on EPDM for improving the compatibility of EPDM, and the thus graft-copolymerized EPDM (referred to hereinafter as EPDM-HIPS) is blended with a polyphenylene ether resin to obtain a composition excellent in impact resistance, heat stability, light stability and weather resistance. For example, JP-B-47-43,174, JP-B-47-43,290, U.S. Pat Nos. 3,943,192, 3,959,211, 3,974,235, 4,127,588 4,152,316, 4,101,505, 4,101,503, 4,101,504 and JP-A-58-111,854 disclose the above proposals.

For the purpose of further improving the impact resistance, a composition comprising EPDM-HIPS and other impact-resistance-improving agents has been proposed. As said other impact-resistance-improving agents, for example, U.S. Pat. Nos. 3,981,841 and 4,020,124 disclose EPDM-HIPS prepared by an emulsion polymerization method and BR graft-copolymerized with methyl methacrylate alone or along with styrene and styrene-butadiene copolymer, both being prepared by an emulsion polymerization method; U.S. Pat. Nos. 4,143,095, 4,172,826 and 4,172,929 disclose a hydrogenated styrene-butadiene-styrene triblock copolymer rubber; U.S. Pat. No. 4,139,574 discloses a hydrogenated styrene-butadiene radial teleblock copolymer; U.S. Pat. No. 4,196,116 discloses a hydrogenated styrene-butadiene diblock copolymer rubber or a hydrogenated isoprene diblock copolymer rubber; U.S. Pat. No. 4,311,633 discloses a styrene-butyl acrylate copolymer; JP-B-63-4,590, JP-A-1-56,100 and JP-A-4-33,306 disclose BR-HIPS; U.S. Pat. No. 4,365,038 discloses a silicone oil; JP-B-63-4,589 discloses a poly-α-olefin; and U.S. Pat. No. 4,373,045 discloses an ethylene-propylene copolymer rubber (referred to hereinafter as EPM).

Moreover, many proposals have been made as to compositions having excellent impact resistance, heat stability, light stability and weather resistance prepared by blending, with a polyphenylene ether resin, a styrene-grafted ethylene-α-olefin copolymer rubber (referred to hereinafter as EPM-HIPS) along with other impact-resistance-improving agents. For example, as said other impact-resistance-improving agents, JP-A-57-139,140 and JP-A-60-36,550 disclose BR-HIPS; and JP-A-59-140,257 discloses a hydrogenated styrene-butadiene-styrene triblock copolymer and a combination system thereof with BR-HIPS.

Also, a composition having excellent impact resistance, heat stability, light stability and weather resistance prepared by blending EPDM-HIPS with a styrene-grafted polyphenylene ether resin has been proposed (see, for example, JP-B-53-39,698 and JP-B-55-44,026).

JP-A-60-36,551 discloses a composition having improved impact resistance and mold release characteristics prepared by blending, with a polyphenylene ether resin, EPDM grafted with styrene and acrylonitrile, BR-HIPS, a styrene-butadiene-styrene triblock copolymer and EPM.

Furthermore, U.S. Pat. No. 4,365,042 discloses a composition having excellent room-temperature impact strength and low-temperature impact strength prepared by blending a silicone rubber grafted EPDM with a polyphenylene ether resin.

Resins are used in automotive parts such as bumper, wheel cover, instrument panel, console box, internal trim parts for door such as pillar/trim and the like. Also, flame retardant resins are used in parts of office automation equipment such as housing and the like. With respect to the automotive parts and parts of office automation equipment, they are required to be resistant to each of light, heat and water and even to a complex influence of them, that is, resistant to weather. Also, these parts are required to have so high level impact resistance at room temperature or low temperatures, particularly surface impact strength that they withstand the collision of other objects or the impact caused by the falling of finished goods having built therein these parts.

Compositions prepared by blending the heretofore proposed EPDM-HIPS or EPM-HIPS or a combination thereof with other impact modifiers with a polyphenylene ether resin have such a problem that they do not satisfy particularly the surface impact strength among the above required characteristics.

As explained above, notwithstanding that many proposals have been made by now for improving the impact resistance of a polyphenylene ether resin, none of the compositions proposed have exhibited satisfactory surface impact strength.

SUMMARY OF THE INVENTION

Under such circumstance, the present inventors have made extensive research aiming at improving the surface impact strength of a polyphenylene ether resin composition and have consequently found that the impact resistance, particularly surface impact strength, can be remarkably improved by blending a graft copolymer prepared by graft-copolymerizing an alkenyl aromatic compound and, if necessary, other unsaturated monomer on an ethylene-α-olefin copolymer rubber having a specific molecular structure as an impact modifier with a polyphenylene ether resin or a mixture thereof with an alkenyl aromatic resin.

According to this invention, there is provided a thermoplastic resin composition having excellent heat resistance, impact resistance and gloss, particularly very good surface impact strength, which comprises a blend of: 95 to 5 parts by weight of a mixture consisting of:

(A) 1 to 100% by weight of a polyphenylene ether resin and (B) 0 to 99% by weight of an alkenyl aromatic resin, with (C) 5 to 95 parts by weight of a graft copolymer obtained by graft-copolymerizing (a) an alkenyl aromatic compound and, if necessary, (b) other unsaturated monomer onto (c) an ethylene-α-olefin copolymer rubber having a ratio (Q value) of weight average molecular weight/number average molecular weight as measured by GPC of 4.0 or less and having a Mooney viscosity at 121° C. of 40 or more in which graft copolymer the weight ratio of the alkenyl aromatic compound (a)/the other unsaturated monomer (b)/the ethylene-α-olefin copolymer rubber (c) is 20–80/0–18.4/80–20 (the total of (a) and (c) is 100 parts by weight) and the weight ratio of the component (b)/[the component (a)+the component (b)] is 0.23 or less, and, if necessary, (D) 0.1 to 50 parts by weight per 100 parts by weight of the composition of a rubbery material.

DETAILED DESCRIPTION OF THE INVENTION

The polyphenylene ether resin (A) used in this invention is a homopolymer consisting of the following recurring unit (I) or a copolymer consisting of the following recurring units (I) and (II):

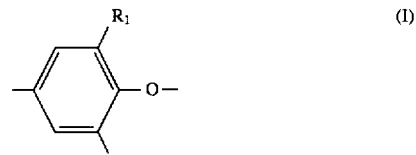

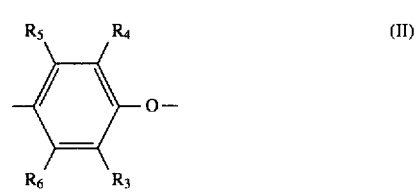

wherein $R_1$, $R_2$, $R_3$, $R_4$, $R_5$ and $R_6$ may be the same as or different from one another and each represents a monovalent residue such as an alkyl group having 1 to 4 carbon atoms excluding t-butyl group, an aryl group, a halogen atom or a hydrogen atom, provided $R_3$ and $R_5$ must not be hydrogen atoms simultaneously.

The polyphenylene ether resin may be a mixture of the homopolymer and the copolymer or a graft copolymer of an alkenyl aromatic compound on the above polymer.

The homopolymer for the polyphenylene ether resin includes specifically the following:
poly(2,6-dimethyl-1,4-phenylene)ether,
poly(2-methyl-6-ethyl-1,4-phenylene)ether,
poly(2,6-diethyl-1,4-phenylene)ether,
poly(2-ethyl-6-n-propyl-1,4-phenylene)ether,
poly(2,6-di-n-propyl-1,4-phenylene)ether,
poly(2-methyl-6-n-butyl-1,4-phenylene)ether,
poly(2-ethyl-6-isopropyl-1,4-phenylene)ether,
poly(2-methyl-6-chloro-1,4-phenylene)ether,
poly(2-methyl-6-hydroxyethyl-1,4-phenylene)ether and
poly(2-methyl-6-chloroethyl-1,4-phenylene)ether.

The copolymer for the polyphenylene ether resin includes a group of polyphenylene ether copolymers each consisting mainly of a polyphenylene ether structure obtained by copolymerizing a monomer from which the above-enumerated homopolymers are derived with o-cresol or an alkyl-substituted phenol represented by the following formula (III) such as 2,3,6-trimethylphenol or the like:

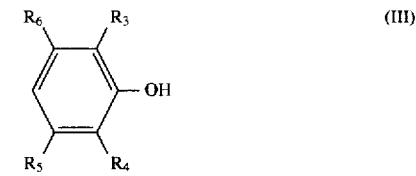

wherein each of $R_3$, $R_4$, $R_5$ and $R_6$ represents a monovalent residue such as an alkyl group having 1 to 4 carbon atoms excluding t-butyl group, a halogen atom or a hydrogen atom, provided $R_3$ and $R_5$ must not be hydrogen atoms simultaneously.

The polyphenylene ether resin is preferably poly(2,6-dimethyl-1,4-phenylene)ether.

The alkenyl aromatic resin (B) used in this invention is that well-known to those skilled in the art which is a polymer or copolymer having a recurring unit represented by the following formula derived from an alkenyl aromatic compound:

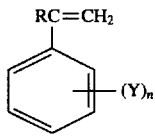

wherein R represents a hydrogen atom, a lower alkyl group or a halogen atom, Y represents a hydrogen atom, a vinyl group, a halogen atom, an amino group, a hydroxyl group or a lower alkyl group and n represents 0 or an integer of 1 to 5.

The term "lower alkyl group" used herein means an alkyl group having 1 to 6 carbon atoms.

Examples of the alkenyl aromatic resin include such homopolymers as polystyrene and polychlorostyrene; polystyrenes modified with natural or synthetic rubbers excluding ethylene-α-olefin copolymer rubber; copolymers of an alkenyl aromatic compound with a copolymerizable unsaturated monomer, for example, styrene copolymers such as styrene-acrylonitrile copolymer, styrene-acrylic acid copolymer, styrene-methyl methacrylate copolymer, styrene-maleic anhydride copolymer, styrene-acrylate copolymer and the like; styrene copolymers modified with the above-mentioned rubbers, and mixtures of them.

The alkenyl aromatic resin may be mixed in any amount with the polyphenylene ether resin.

The graft copolymer (C) used in this invention is obtained by graft-copolymerizing (a) an alkenyl aromatic compound and, if necessary, (b) other unsaturated monomer onto (c) an ethylene-α-olefin copolymer rubber. In the graft copolymer, each component is contained in such a proportion that the weight ratio of the component (a) : the component (b) : the component (c) is 20–80: 0–18.4: 80–20, provided the component (a)+the component (b)=100 parts by weight, and the weight ratio of (b)/[the component (a)+the component (b)] is 0.23 or less.

When the amount of the ethylene-α-olefin copolymer rubber (c) is less than 20 parts by weight, the improvement effect on impact resistance is small and when it exceeds 80 parts by weight, the amount of the component (a) becomes small and the compatibility with the polyphenylene ether resin (A) becomes inferior and hence the impact resistance is not improved. Also, when the weight ratio of the component (b)/[the component (a)+the component (b)] exceeds 0.23, the compatibility with the component (A) becomes low and the impact resistance is not improved.

The alkenyl aromatic compound (a) used herein is a compound represented by the following formula and may be used alone or in combination of two or more:

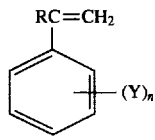

wherein R represents a hydrogen atom, a lower alkyl group or a halogen atom; Y represents a hydrogen atom, a vinyl group, a halogen atom, an amino group, a hydroxyl group or a lower alkyl group; and n represents 0 or an integer of 1 to 5.

Specific examples of the alkenyl aromatic compound (a) include styrene, α-methylstyrene, α-chlorostyrene, vinyltoluene, divinylbenzene and the like. Styrene is particularly preferred.

The unsaturated monomer (b) is a compound copolymerizable with the alkenyl aromatic compound (a), and is mentioned in, for example, "Kobunshi Data Handbook Kiso Hen", pages 444–459 (Edited by High Polymer Society, Japan, 1986, published by Baifukan).

Specific examples of the other unsaturated monomer (b) include unsaturated carboxylic acids such as acrylic acid, methacrylic acid and the like; alkyl esters of the above acids such as methyl (meth)acrylate, ethyl (meth)acrylate, butyl (meth)acrylate and the like; unsaturated dicarboxylic acids and anhydrides such as fumaric acid, maleic acid, maleic anhydride, itaconic acid and the like; derivatives of said unsaturated dicarboxylic acids and anhydrides such as monoethyl and diethyl esters of maleic acid, N-phenylmaleimide, N,N'-metaphenylenebismaleimide and the like; acrylamide; N-(hydroxymethyl)acrylamide; glycidyl derivatives of (meth)acrylic acid such as glycidyl (meth)acrylate; vinyl acetate; vinyl cyanide compounds such as acrylonitrile, methacrylonitrile and the like; etc.

The ethylene-α-olefin copolymer rubber (c) is required to have a ratio (Q value) of weight average molecular weight/number average molecular weight as determined by gel permeation chromatograph (GPC) measurement of 4.0 or less, preferably 3.5 or less. When the Q value is more than 4.0, the composition obtained does not have a sufficient surface impact strength.

The GPC measurement is conducted by the method described in "Kobunshi Sokuteiho=Kozo to Bussei" (First), pages 76–89 (Edited by High Polymer Society, Japan, 1973, published by Baifukan). For example, the GPC measurement conditions are as follows:

GPC: Model 150C manufactured by Waters

Column: Shodex AC-80M manufactured by Showa Denko K. K.

Sample amount: 300 μl (Polymer conc. 0.2 wt. %)

Flow rate: 1 ml/min

Temperature: 135° C.

Solvent: 1,2,4-Trichlorobenzene

The calibration curve is prepared in a conventional manner using standard polystyrene manufactured by TOSOH CORP. The data treatment is effected using Data Processor CP-8 Model III manufactured by TOSOH CORP.

The content of the α-olefin component in the copolymer is usually 15 to 85% by weight. Particularly in view of surface impact strength at low temperatures, it is preferably 30 to 65% by weight, more preferably 35 to 60% by weight. The Mooney viscosity at 121° C. is 40 or more, preferably 50 or more. It is not desirable to use the copolymer having so high a Mooney viscosity at 121° C. as to cause insufficient dispersion of the graft product. The Mooney viscosity at 121° C. is preferably 120 or less.

Such an ethylene-α-olefin copolymer rubber having a narrow molecular weight distribution can be prepared by the method disclosed in JP-B-43-13,052 and JP-A-2-77,410, that is, by copolymerizing ethylene and an α-olefin and, if necessary, a non-conjugated diene as a third component in the presence of a Ziegler-Natta catalyst system consisting of a vanadium compound, an organoaluminum compound and a halogenated ester compound in an inert organic solvent such as a hydrocarbon.

As the above-mentioned organoaluminum compound, there can be used an alkylaluminum sesquichloride, a trialkylaluminum, a dialkylaluminum monochloride or a mixture thereof, and as the vanadium compound, there can be used vanadium oxytrichloride, vanadium tetrachloride or a vanadate compound represented by $VO(OR^8)_q X_{3-q}$ in which $0 < q \leq 3$, $R^8$ is a straight or branched chain or cyclic hydrocarbon having 1 to 10 carbon atoms, or the like.

The α-olefin component includes mono-α-olefins such as propylene, butene-1, pentene-1 and the like. The non-conjugated diene as a third component includes ethylidenenorbornene, dicyclopenadiene, 1,4-hexadiene and the like. Specific examples of the ethylene-α-olefin copolymer rubber (c) include ethylene/propylene copolymer rubber, ethylene/butene-1 copolymer rubber, ethylene/propylene/ethylidenenorbornene terpolymer rubber, ethylene/propylene/dicyclopentadiene terpolymer rubber and the like.

The method of grafting (a) an alkenyl aromatic compound and, if necessary, (b) other unsaturated monomer onto (c) an ethylene-α-olefin copolymer rubber is not limited to the methods described herein and may be any known method. That is to say, there may be adopted an emulsion polymerization method, a bulk polymerization method (JP-B-42-662 or U.S. Pat. No. 3,435,096), a solution polymerization method (U.S. Pat. Nos. 3,538,190 and 3,538,191) and a suspension polymerization method (JP-B- 49-10,831, JP-B57-40,166 and JP-B-62-10565). In the case of the non-conjugated diene-free ethylene-α-olefin copolymer rubber (c), particularly preferred is a suspension polymerization method by which the alkenyl aromatic compound (a) and, if necessary, the other unsaturated monomer (b) are graft-copolymerized in the presence of any amounts of a free radical initiator and a dispersing agent in an aqueous suspension.

As the dispersing agent, there may be used, for example, polyvinyl alcohol, a cellulose compound, an acrylic acid compound, an inorganic salt, an alkylene oxide or the like.

The free radical initiator includes, for example, organic peroxides such as benzoyl peroxide, lauroyl peroxide, t-butyl peroxypivalate, t-butyl hydroperoxide, dicumyl peroxide and the like.; azo compounds such as azobisisobutyronitrile, azobisdimethylvaleronitrile and the like; etc.

The graft product thus prepared is composed of the following three components: the graft copolymer (C) in which the alkenyl aromatic compound (a) and if necessary the other unsaturated monomer (b) are truly graft-copolymerized onto the ethylene-α-olefin copolymer rubber (c), the (a)/(b) copolymer and the third component (c). In this case, the (a)/(b) copolymer is one component of the alkenyl aromatic resin (B) and (c) is one component of the rubbery material (D). The proportion of the contents of the three components in the graft product is determined by, for example, a solvent fractionation method as shown in the Examples which appear hereinafter, or the like.

The rubbery material (D) used in this invention refers to natural and synthetic polymeric materials which are elastomers at room temperature, and includes specifically ethylene-α-olefin copolymer rubber, ethylene-propylene copolymer rubber, ethylene- butene-1 copolymer rubber, ethylene-propylene-non-conjugated diene copolymer rubber and ethylene-butene-1 copolymer rubber; polybutadiene; styrene-butadiene copolymer rubber; styrene block copolymer rubbers such as block copolymer having at least two units selected from styrene unit and butadiene unit, hydrogenated block copolymer having at least two styrene-butadiene units, block copolymer having at least two styrene-isoprene units and hydrogenated block copolymer rubber having at least two styrene-isoprene units; polyurethane rubber; and the like, and mixtures thereof. Alternatively, modified rubbers prepared by modifying the above-mentioned rubbers with a functional monomer including other acids, epoxy or the like may be used. Among them, ethylene-α-olefin copolymer rubber and styrene block copolymer rubber are particularly preferred.

The ethylene-α-olefin copolymer rubber includes those used in the production of the graft copolymer (C).

Many methods for producing the styrene block copolymer rubber have been proposed, and a representative method thereof comprises block polymerizing an alkenyl aromatic hydrocarbon and a conjugated diene hydrocarbon in an inert solvent with a lithium catalyst or a Ziegler catalyst to prepare a block copolymer rubber consisting of an alkenyl aromatic hydrocarbon polymer block (the block A) and a conjugated diene hydrocarbon polymer block (the block B). This block copolymer rubber is commercially available in the name of CARIFLEX (registered trademark) TR1101 from Shell Chemical in USA.

The hydrogenation of the above block copolymer rubber is conducted by the method described in, for example, JP-B-42-8,704, JP-B-43-6,636 or JP-B-46-20,814 in the presence of a hydrogenation catalyst in an inert solvent. The degree of hydrogenation is at least 50%, preferably at least 80%, of the block B, and the 25% or less of the aromatic unsaturation in the block A is hydrogenated. The thus partially or completely hydrogenated block copolymer is commercially available in the name of KRATON-G (registered trademark) from Shell Chemical in USA, which is a representative.

As the styrene block copolymer rubber, there is used such that the number average molecular weight of the block copolymer rubber is 10,000 to 1,000,000, preferably 20,000 to 300,000, the number average molecular weight of the alkenyl aromatic polymer block (the block A) in the block copolymer rubber is 1,000 to 200,000, preferably 2,000 to 100,000, the number average molecular weight of the conjugated diene polymer block (the block B) is 1,000 to 200,000, preferably 2,000 to 100,000, and the weight ratio of the block A to the block B is 1/98 to 60/40, preferably 10/90 to 40/60.

The polyphenylene ether thermoplastic resin composition of this invention comprises a blend of 95 to 5 parts by weight, preferably 93 to 7 parts by weight, of a mixture consisting of (A) 1 to 100% by weight, preferably 10 to 90% by weight of a polyphenylene ether resin and (B) 99 to 0% by weight, preferably 90 to 10% by weight, of an alkenyl aromatic resin, with (C) 5 to 95 parts by weight, preferably 7 to 93 parts by weight, of a graft copolymer. In the above mixture, when the polyphenylene ether resin (A) is in an amount of less than 1% by weight, the resulting composition has unsatisfactory heat resistance. Also, when the graft copolymer (C) is in an amount of less than 5 parts by weight, the resulting composition has unsatisfactory impact resistance, and when the amount is more than 95 parts by weight, the heat resistance and rigidity are not satisfactory.

The polyphenylene ether resin composition of this invention may contain (D) a rubbery material in an amount of 0.1 to 50 parts by weight, preferably 2 to 45 parts by weight, per 100 parts by weight of the composition consisting of the components (A), (B) and (C). When the amount of the rubbery material is less than 0.1 part by weight, the impact resistance tends to be insufficient and when the amount exceeds 50 parts by weight, the heat resistance and rigidity tend to be insufficient.

In practicing this invention, it is possible to add a crystalline olefin polymer having a crystallinity of 15% or more to the thermoplastic resin composition of this invention. Specific examples of the crystalline olefin polymer include, for example, polymers of olefins per se such as polypropylene, high density polyethylene, low density polyethylene, straight chain low density polyethylene, propylene-ethylene copolymer, ethylene-butene-1 copolymer, ethylene-pentene copolymer, ethylene-hexene copolymer, poly-4-methyl-pentene-1 and the like; and copolymers of a major amount of olefins and vinyl monomers copolymerizable therewith (for example, acrylic acid esters, methacrylic acid esters, vinyl acetate, styrene, acrylonitrile, glycidyl (meth)acrylate, and the like). The copolymer may be any of random copolymer, block copolymer and graft copolymer. These may be used alone or even in admixture of two or more. Among these olefin polymers, preferred are polyethylene, polypropylene, ethylene-propylene random copolymer and ethylene-propylene block copolymer, and particularly preferred are polypropylene, ethylene-propylene random copolymer and ethylene-propylene block copolymer.

The above olefin polymers are produced by any method known to those skilled in the art, for example, the method described in Encyclopedia of Polymer Science and Technology, Vol. 6, page 275 (1967) and Vol. 11, page 597 (1969) (published by John Wiley & Sons, Inc.)

In carrying out this invention, the thermoplastic resin composition may have added thereto other high molecular weight compounds and compatibilizing agent. Said other high molecular weight compounds include, for example, such polymers as polyvinyl chloride, polymethyl methacrylate, polyvinyl acetate, polyvinylpyridine, polyvinylcarbazole, polyacrylamide, polyacrylonitrile and the like; condensation type high molecular weight compounds, for example, polycarbonate, polysulfone, polyethersulfone, polyesters such as polyethylene terephthalate and polybutylene terephthalate, polyarylene ester (e.g., U Polymer of UNITIKA, LTD.), polyphenylene sulfide, polyamides such as 6-nylon, 6,6-nylon, 12-nylon and the like, polyacetal, and the like; and various thermosetting resins such as silicone resin, fluororesins, polyimides, polyamideimides, phenol resins, alkyd resins, unsaturated polyester resins, dabon resins and the like.

Among said other high molecular weight compounds, preferred are polyesters such as polycarbonate, polyethylene terephthalate, polybutylene terephthalate, and polyarylene ester and polyamides.

The thermoplastic resin composition of this invention may further contain a filler for the purpose of reinforcement, imparting a function, extension (cost down) or the like.

The filler includes fibers, for example, glass fiber, carbon fiber, polyamide fiber, fiber and whisker of a metal such as aluminum, stainless steel or the like, and the like; and inorganic fillers such as silica, alumina, calcium carbonate, talc, mica, clay, kaolin, magnesium sulfate, wollastonite, carbon black, $TiO_2$, ZnO and $Sb_2O_3$.

All the above fillers may be used for reinforcement. Such fillers as carbon fiber, metal fiber, carbon black and the like reduce the surface resistivity and volume resistivity to impart electrical conductivity to the thermoplastic resin composition of this invention. As far as fillers are less expensive than the thermoplastic resin composition of this invention, they may be used as an extender to down the cost.

In order to improve the rigidity and heat resistance of the thermoplastic resin composition, it is particularly preferable to use, as the filler, an inorganic filler such as glass fiber, potassium titanate whisker, talc, mica, calcium carbonate or the like or carbon fiber.

The thermoplastic resin composition of this invention may have added thereto a flame retardant or flame retarding adjuvant such as $Sb_2O_3$, a halogen-containing compound, a phosphoric acid ester or the like; a lubricant; a nucleating agent; a plasticizer such as triphenyl phosphate, phthalic acid ester or the like; a dyestuff; a pigment; an antistatic agent; an antioxidant; a weather-resistance-imparting agent; or the like to prepare a composite material, the use of the composition in the form of a composite material is one of the preferred embodiments.

The thermoplastic resin composition of this invention may be prepared by various methods including solution blending, melt-kneading and the like, and melt-kneading is preferred. The method of melt-kneading includes a method comprising uniformly mixing the above components by a mixing means to be used for mixing resins with one another or together with a liquid or solid additive such as Hencshel mixer, super mixer, ribbon blender, V blender or the like, and then kneading the resulting mixture by a kneading means such as Bunbury mixer, plastomill, Brabender Plastograph, single or multiple screw extruder or the like, and other like methods.

DESCRIPTION OF PREFERRED EMBODIMENTS OF THE INVENTION

This invention is explained in more detail below referring to Examples; however, this invention is not to be construed to be limited thereto.

The method of analysis of structure of each component and the method of evaluation of physical properties of each composition used in the Examples are explained below.
Method of analyzing structure of ethylene-α-olefin copolymer rubber (c):

(1) Propylene content and butene-1 content

A pressed sheet was prepared and subjected to infrared spectroscopic analysis, and these contents were determined by a calibration curve method using the absorbance values of characteristic absorptions of ethyl ($-C_2H_5$), methyl ($-CH_3$) and methylene ($-CH_2-$) appearing in the infrared absorption spectra.

(2) Iodine value

This was used as a method of determining the amount of conjugated diene. According to the method prescribed in JIS K3331, the amount (g) of iodine consumed per 100 g of polymer was determined.

(3) Mooney viscosity

Measured according to the method prescribed in JIS K6300. The measurement temperature was 121° C.

(4) Molecular weight distribution

Polystyrene-reduced weight average molecular weight and number average molecular weight were determined by the following GPC method, and the ratio of the weight average molecular weight/the number average molecular weight was determined as a Q value by calculation. The conditions for measurement by GPC were as follows:

GPC: Model 150 C manufactured by Waters.

Column: Shodex A-80M manufactured by Showa Denko K. K.

Sample amount: 400 μl (polymer conc.: 0.1 wt. %)

Flow rate: 1 ml/min

Temperature: 140° C.

Solvent: o-Dichlorobenzene

The calibration curve was prepared in a conventional manner using standard polystyrene manufactured by TOSOH CORP. The data processing was conducted by a data processor CP-8 Model III manufactured by TOSOH CORP.

(5) Crystallinity

Measured by the X-ray diffractometry reported in S. L. Aggarwal et al., Journal of Polymer Science, Vol. 18, pages 17–26 (1955).

Method of evaluating physical properties of composition:

(1) Izod impact strength

Measured by the method prescribed in JIS K7110. The thickness of a test piece was 3.2 mm, and notch impact strength was evaluated. The measurement temperature was 23° C. unless otherwise specified. When other temperatures were used, the test piece was conditioned for two hours in a constant temperature bath at the predetermined temperature and then measurement was conducted.

(2) Heat deformation temperature

Measured by the method prescribed in JIS K7207. The fiber stress was measured at 18.6 kg/cm$^2$.

(3) Surface impact strength

Falling weight impact strength was evaluated as surface impact strength by a method approximate to ASTM D3029. A dart having a diameter of 12.7 mm and a point R of 6.4 mm was placed on a test piece, and the test piece was fixed with a support ring having a diameter of 50 mm. The weight was allowed to fall from a predetermined height under a constant load onto the test piece to evaluate whether the test piece was broken. The breaking energy when 50% of the test piece was broken was determined by calculation, and this value was taken as the falling weight impact strength (FWI). The test piece was a flat plate having a thickness of 3 min.

The conditioning was conducted in a constant temperature bath. The test piece was placed in a constant temperature bath whose temperature was previously adjusted to the predetermined temperature, conditioned for two hours and then subjected to the above-mentioned test. This predetermined temperature was taken as the measurement temperature.

Method of evaluating intrinsic viscosity:

Using a Ubbellohde viscometer, reduced viscosity was measured at three solution concentrations of 0.1, 0.2 and 0.5 g/dl. The intrinsic viscosity was determined by the calculation method described in "Kobunshi Yoeki, Kobunshi Jikkengaku 11" published by Kyoritsu Shuppan K. K., 1982, page 491, that is, an extrapolation method by which reduced viscosity was plotted to concentration and the viscosity at a concentration of 0 is determined by extrapolation.

Method of analyzing composition of graft product:

A 0.8% by weight solution of a sample in deuterochloroform as a solvent was prepared and subjected to measurement of proton nuclear magnetic resonance (NMR) spectrum at 35° C. at 250 MHz.

Composition analysis was made by calculation from peak intensity of NMR using absorptions of phenyl proton of styrene, R proton of —O—R of alkyl methacrylate and proton of —CH—CN of acrylonitrile.

Method of fractionation of graft product:

A graft product obtained by graft polymerization is composed of the following three constituents: ungrafted styrene-methyl methacrylate (MMA) copolymer resin (referred to hereinafter as free-MS), ungrafted EPR (referred to hereinafter as free EPR) and truly grafted styrene-methyl methacrylate-EPR graft copolymer (referred to hereinafter as MS-g-EPR). These three constituents were fractionated by the following method. The same analysis method was applied to styrene and comonomers other than MMA. Here, EPR means ethylene-α-olefin copolymer rubber.

In a laboplastomill Model R-100 manufactured by Toyo Seiki K. K., 80 g of graft product particles were kneaded at 220° C. at a rotor revolution rate of 80 rpm for four minutes and then cut to 5-mm square pieces. Five grams of the pieces were immersed in 300 ml of methyl ethyl ketone at a temperature of 80° C. to 83° C. for four hours to extract the free-MS which is ungrafted. The extraction residue was dried and then cut to 2-mm square pieces and 3 g of the pieces were immersed in 200 ml of hexane at room temperature for a period of 40 to 48 hours to extract the free EPR which is ungrafted. The amounts of the free-MS, the free-EPR and the MS-g-EPR were determined by the above-mentioned method.

The THF gel component amount is the proportion (weight %) of the extraction residue obtained by immersing in 150 ml of tetrahydrofuran (THF) 1 g of 5-mm square pieces obtained by grinding the kneaded graft product obtained in the same manner as in the fractionation method and subjecting them to extraction at about 60° C. for six hours, and said proportion indicates the amount of the cross-linked rubber component produced by graft polymerization.

Also, the intrinsic viscosity of the free-MS was determined under the conditions of 30° C. and toluene solution.

Reference Example 1

(Ethylene-α-olefin copolymer rubber) (Synthesis of EPM-1)

In a 100-liter SUS-made polymerizer equipped with agitating blades, ethylene and propylene were continuously copolymerized. That is to say, hexane was continuously fed as a polymerization solvent to the polymerizer from its lower part at a rate of 100 liters/hour. On the other hand, the resulting polymerization mixture was taken out from the upper part of the polymerizer so that the amount of the polymerization mixture in the polymerizer was always adjusted to 100 liters. As a catalyst, vanadium trichloride (VOCl$_3$), ethylaluminum sesquichloride (EASC), n-butyl perchlorocrotonate were continuously fed to the polymerizer from its lower part at rates of 2.9 g/hour, 29.1 g/hour and 14.6 g/hour, respectively. As monomers, ethylene and propylene were fed to the polymerizer from its lower part at rates of 3.8 kg/hour and 19.1 kg/hour, respectively. The molecular weight modification was conducted with hydrogen. The copolymerization reaction was conducted at 46° C. while cooling water was circulated to the jacket fixed on the outside of the polymerizer.

A small amount of methanol was added to the polymerization mixture taken out of the polymerizer to terminate the polymerization reaction, after which the polymerization mixture was subjected to monomer-removal and water-washing. Thereafter, the solvent was removed with steam in a large amount of water, and a polymer was then taken out and then dried at 80° C. for day and night under reduced pressure. By the above procedure, an ethylene-propylene copolymer was obtained at a rate of 6.5 kg/hour.

The propylene content of the copolymer was 54% by weight as measured by an infrared spectroscopic analysis and the Q value of the copolymer obtained by the GPC measurement (weight average molecular weight Mw/number average molecular weight Mn) was 1.8.

Measurement results are shown in Table 1.

(Synthesis of EPM-2 to EPM-10)

Polymers were obtained in basically the same manner as in the synthesis of EPM-1, except that the polymerization temperature, the amount of the catalyst fed and the amount of the monomer fed were changed as shown in Table 1. Incidentally, it should be noted that examples in which methyl dichlorophenylacetate or ethyl trichloroacetate was used as the halogenated ester (EPM-3, 7 and 9) in place of the n-butyl perchlorocrotonate and an example in which no halogenated ester was used (EPM-2, 4, 5, 8 and 10) are also shown in Table 1.

Measurement results are shown in Table 1.

(EBM-1 and EBM-2)

Copolymers were obtained in basically the same manner as in the synthesis of EPM-1, except that the polymerization conditions shown in Table 1 were used.

Measurement results are shown in Table 1.
(EPDM-1 to EPDM-4)

Copolymers were obtained in basically the same manner as in the synthesis of EPM-1, except that ethylidenenorbornene was used as a monomer together with ethylene and propylene and the polymerization conditions shown in Table 1 were used.

Measurement results are shown in Table 1.

ylene-propylene copolymer rubber was suspended in the pure water.

Subsequently, to the suspension were added 9 g of t-butyl peroxypivalate as a polymerization initiator, 0.18 g of p-benzoquinone as a polymerization inhibitor and styrene and methyl methacrylate as monomers in the amounts shown in Table 2, immediately after which the autoclave was placed in an oil bath previously heated to 30° C. to start elevation

TABLE 1

| | Polymerization conditions | | | | | | |
|---|---|---|---|---|---|---|---|
| | Polym. temp. (°C.) | EASC feed (g/H) | VOCl feed (g/H) | Halogenated ester feed (g/H) | Ethylene feed (Kg/H) | Propylene feed (Kg/H) | 1-Butene feed (Kg/H) |
| EPM | | | | | | | |
| 1 | 46 | 29.1 | 2.9 | 14.6 (1) | 3.8 | 19.1 | — |
| 2 | 43 | 10.4 | 4.4 | — | 3.7 | 18.9 | — |
| 3 | 50 | 14.2 | 0.14 | 7.1 (2) | 5.3 | 19.1 | — |
| 4 | 60 | 72.2 | 18.1 | — | 5.3 | 19.1 | — |
| 5 | 60 | 96.3 | 24.0 | — | 3.7 | 21.5 | — |
| 6 | 43 | 14.8 | 1.5 | 7.4 (1) | 4.2 | 19.8 | — |
| 7 | 43 | 14.8 | 1.5 | 7.4 (2) | 4.2 | 19.8 | — |
| 8 | 50 | 40.1 | 7.9 | — | 6.3 | 15.3 | — |
| 9 | 50 | 5.8 | 0.58 | 2.9 (3) | 6.3 | 15.3 | — |
| 10 | 60 | 41.3 | 8.3 | — | 6.3 | 15.3 | — |
| EBM | | | | | | | |
| 1 | 50 | 3.8 | 0.38 | 1.9 (1) | 3.1 | — | 5.8 |
| 2 | 50 | 3.8 | 0.38 | 1.9 (1) | 3.1 | — | 2.9 |
| EPDM | | | | | | | |
| 1 | 44 | 4.8 | 0.32 | 1.6 (3) | 3.6 | 16.0 | — |
| 2 | 50 | 61.1 | 12.0 | — | 5.5 | 15.0 | — |
| 3 | 49 | 103 | 12.9 | — | 3.4 | 17.8 | — |
| 4 | 59 | 45.2 | 19.6 | — | 3.4 | 17.8 | — |

| | | Polymer analysis value | | | | |
|---|---|---|---|---|---|---|
| ENB feed (Kg/H) | Amount of polymer produced (Kg/H) | Propylene content | Iodine value | ML 1 + 4 121° C. | GPC Q value | Crystallinity |
| — | 6.5 | 54 | — | 42 | 1.8 | 0 |
| — | 6.2 | 53 | — | 32 | 4.2 | 0 |
| — | 6.5 | 40 | — | 44 | 1.8 | 0 |
| — | 8.5 | 41 | — | 44 | 4.1 | 0 |
| — | 6.2 | 63 | — | 48 | 4.2 | 0 |
| — | 6.2 | 50.4 | — | 64 | 1.8 | 0 |
| — | 6.2 | 49.0 | — | 74 | 1.8 | 0 |
| — | 6.1 | 27 | — | 48 | 2.6 | 3 |
| — | 6.1 | 27 | — | 58 | 1.8 | 3 |
| — | 6.9 | 28.5 | — | 64 | 2.4 | 2 |
| — | 2.9 | 17.5 | — | 52 | 1.8 | 12 |
| — | 2.9 | 10.0 | — | 52 | 1.8 | 24 |
| 0.29 | 5.3 | 44 | 8.5 | 63 | 3.3 | 2 |
| 0.32 | 5.5 | 28 | 10 | 63 | 3.2 | 0 |
| 0.23 | 5.5 | 50 | 7.3 | 40 | 2.7 | 0 |
| 0.23 | 5.5 | 50 | 6.9 | 40 | 4.4 | 0 |

Note:
(1) n-Butyl perchlorocrotonate
(2) Methyl dichlorophenylacetate
(3) Ethyl trichloroacetate Reference Example 2

(Graft product I)

In a 5-liter autoclave equipped with a stirrer were placed 2,200 ml of pure water in which 6 g of Pluronic F68 manufactured by ASAHI DENKA KOGYO K. K. had been dissolved as a dispersing agent and 300 g of EPM-1, EPM-2, EPM-3 or EPM-4 synthesized in Reference Example 1 which had been cut to 3-mm to 6-mm square pieces as an ethylene-propylene copolymer rubber (EPM), and the ethof temperature. The temperature was elevated at a rate of about 1° C. per minute to 110° C. and then kept at 110° C. for 30 minutes to conduct polymerization. The resulting particulate graft product was washed with water and then dried at 90° C. in vacuo, and the rubber content in the graft polymer particles obtained was determined from the recovery. The graft products obtained are referred to hereinafter as G-EPM-1, G-EPM-2, G-EPM-3 and G-EPM-4, respectively.

The proportions of base rubber and monomers charged in the production of the graft product and the rubber contents in the graft products obtained are shown in Table 2-1.

Reference Example 3

(Graft product II)

Graft products were obtained in the same manner as in Reference Example 2, except that ethylene-propylene-ethylidenenorbornene rubbers (EPDM-1, EPDM-2, EPDM-3 and EPDM-4) were used as the base rubber. The graft products obtained are referred to hereinafter as G-EPDM-1, G-EPDM-2, G-EPDM-3 and G-EPDM-4, respectively.

The recipes used and the rubber contents in the graft products are shown in Table 2-1.

Reference Example 4

(Graft product III)

In the same autoclave as in Reference Example 3 were placed 2,200 ml of pure water in which 2.5 g of a dispersing agent (Pluronic F68) had been dissolved and 125 g of the ethylene-propylene-ethylidenenorbornene copolymer rubber (EPDM-1) shown in Table 1 which had been cut to 3-mm to 6-mm square pieces and they were stirred to suspend the copolymer rubber in the pure water. Subsequently, polymerization was conducted in the same manner as in Reference Example 3, except that to the suspension were added 3.75 g of t-butyl peroxypivalate as a polymerization initiator, 0.071 g of p-benzoquinone as a polymerization inhibitor and styrene and methyl methacrylate as monomers in the amounts shown in Table 2-2. After the polymerization, the resulting polymerization mixture was cooled to room temperature and then the monomers in the amounts shown in Table 2-2, 5 g of the initiator and 0.1 g of the inhibitor were added again, and in the same manner as in the above first step, temperature-elevating polymerization was conducted. The resulting graft products are referred to hereinafter as G-EPDM-5, G-EPDM-6, G-EPDM-7 and G-EPDM-8. The recipes used and the rubber contents in the graft products are shown in Table 2-2.

Reference Example 5

(Graft product IV)

The same procedure as in Reference Example 4 was repeated, except that the styrene/MMA weight ratio of the monomers added in the graft polymerization was changed to 55/45 as shown in Table 2-2, to obtain a graft product. This is referred to hereinafter as G-EPDM- 9. The rubber content in the graft product is shown in Table 2-2.

Reference Example 6

(Graft product V)

In the same manner as in Reference Example 5, multi-stage polymerization was conducted, except that EPM-6 was used as the base rubber with the recipe shown in Table 2-3 and the monomers, the initiator and the inhibitor were added in each stage, the proportions of the initiator and inhibitor being 3.0 parts by weight and 0.06 part by weight, respectively, per 100 parts by weight of the monomers. The resulting graft products are referred to hereinafter as G-EPM-5, G-EPM-6 and G-EPM7. The rubber contents in the graft products are shown in Table 2-3.

TABLE 2-1

| Reference Example No. | Graft product No. | Feed ratio (parts by weight) | | | | Rubber content in graft product (% by weight) |
|---|---|---|---|---|---|---|
| | | Base rubber | | Graft monomer | | |
| | | | | Styrene | MMA | |
| 2 | G-EPM-1 | EPM-1 | 100 | 84 | 16 | 55.5 |
| | G-EPM-2 | EPM-2 | 100 | 84 | 16 | 56.7 |
| | G-EPM-3 | EPM-3 | 100 | 84 | 16 | 51.9 |
| | G-EMP-4 | EPM-4 | 100 | 84 | 16 | 53.1 |
| 3 | G-EPDM-1 | EPDM-1 | 100 | 84 | 16 | 52.5 |
| | G-EPDM-2 | EPDM-2 | 100 | 84 | 16 | 52.0 |
| | G-EPDM-3 | EPDM-3 | 100 | 84 | 16 | 57.3 |
| | G-EPDM-4 | EPDM-4 | 100 | 84 | 16 | 56.9 |

TABLE 2-2

| Reference Example No. | Graft product No. | Feed ratio (parts by weight) | | | | | Rubber content in graft product (% by weight) |
|---|---|---|---|---|---|---|---|
| | | Base rubber | | 1st step | | 2nd step | |
| | | | | styrene | MMA | Styrene | MMA | |
| 4 | G-EPDM-5 | EPDM-1 | 100 | 100 | 0 | 133.3 | 0 | 32.7 |
| | G-EPDM-6 | EPDM-1 | 100 | 95 | 5 | 126.6 | 6.3 | 32.1 |
| | G-EPDM-7 | EPDM-1 | 100 | 84 | 16 | 112.0 | 21.3 | 31.6 |
| | G-EPDM-8 | EPDM-1 | 100 | 80 | 20 | 106.6 | 26.7 | 31.2 |
| 5 | G-EPDM-9 | EPDM-1 | 100 | 55 | 45 | 73.3 | 60.0 | 30.7 |

TABLE 2-3

| Reference Example No. | Graft product | Base rubber | | Feed ratio (parts by weight) | | | | | | Rubber content in graft product (% by weight) |
|---|---|---|---|---|---|---|---|---|---|---|
| | | | | 1st step | | 2nd step | | 3rd step | | |
| | | | | Styrene | MMA | Styrene | MMA | Styrene | MMA | |
| 6 | G-EPM-5 | EPM-6 | 100 | 120 | — | 140 | — | 140 | — | 23.7 |
|   | G-EPM-6 | EPM-6 | 100 | 114 | 6 | 133 | 7 | 133 | 7 | 24.2 |
|   | G-EPM-7 | EPM-6 | 100 | 100.8 | 19.2 | 117.6 | 22.4 | 117.6 | 22.4 | 25.1 |

Reference Example 7

(Graft product VI)

Graft polymerization was conducted with the recipe shown in Table 3-1 in the same manner as in Reference Example 2, except that EPM-6 or EPM-7 was used as the base rubber. The graft products obtained are referred to hereinafter as G-EPM-8 and G-EPM-9, respectively.

The rubber contents in the graft products obtained are shown in Table 3-1.

Reference Example 8

(Graft product VII)

Graft polymerization was conducted with the recipe shown in Table 3-1 in the same manner as in Reference Example 7, except that EPM-8, EPM-9 and EPM-10 were used as the base rubber.

The graft products obtained are referred to hereinafter as G-EPM-10, G-EPM-11 and G-EPM-12, respectively.

The rubber contents in the graft products obtained are shown in Table 3-1.

Reference Example 9

(Graft product VIII)

EPM-6 and EBM-1 as the ethylene-butene-1 copolymer rubber were kneaded at an EPM-6/EBM-1 weight ratio of 50/50 or 30/70 under the conditions mentioned in the above paragraph "Method of fractionation of graft product". The blends obtained are referred to hereinafter as EBP-1 and EBP-2, respectively.

Graft polymerization was conducted with the polymerization recipe shown in Table 3-1 in the same manner as in Reference Example 7, except that EBP-1, EBP-2 or EBM-3 was used as the base rubber. The graft products obtained are referred to hereinafter as G-EBP-1, G-EBP-2 and G-EBM-1. The rubber contents in the graft products are shown in Table 3-1.

Reference Example 10

(Graft product IX)

Graft polymerization was conducted with the polymerization recipe shown in Table 3-1 in the same manner as in Reference Example 7. The graft product obtained is referred to hereinafter as G-EPM-13. The rubber content in the graft product obtained is shown in Table 3-1.

Reference Example 11

(Graft product X)

Graft polymerization was conducted in the same manner as in the case of G-EPDM-6 in Reference Example 4, except that the MMA was replaced with isodecyl methacrylate, stearyl methacrylate, isobornyl methacrylate or 2-ethylhexyl methacrylate. The graft products obtained are referred to hereinafter as G-EPDM-10, G-EPDM-11, G-EPDM-12 and G-EPDM-13. The rubber contents in the graft products obtained were 32.4% by weight, 31.6% by weight, 31.3% by weight and 31.7% by weight, respectively.

Reference Example 12

(Graft product XI)

Graft polymerization was conducted in the same manner as in Reference Example 4, except that acrylonitrile (referred to hereinafter as AN) was substituted for the MMA and the base rubber and monomers were used in the feed ratio shown in Table 3-2. The graft products obtained are referred to hereinafter as G-EPDM-14, G-EPDM-15 and EPDM-16. The rubber contents in the graft products obtained are shown in Table 3-2.

Reference Example 13

(Graft product XII)

Graft polymerization was conducted in the same manner as in Reference Example 4, except that EBM-2 was used as the base rubber and the proportions of the base rubber and the monomers were as shown in Table 3-3. The graft products obtained are referred to hereinafter as G-EMB-2. The rubber content in the graft product obtained is shown in Table 3-3.

Reference Example 14

(Graft product XIII)

Graft polymerization was conducted in the same manner as in Reference Example 3, except that EPDM-1 was used as the base rubber, the proportions of the base rubber and monomers charged were as shown in Table 3-3 and the initiator was used in an amount of 1.8 parts by weight per 100 parts by weight of a total of the base rubber and the monomers. The graft products obtained are referred to hereinafter as G-EPDM-17, G-EPDM-18 and G-EPDM-19. The rubber contents in the graft products obtained are shown in Table 3-3.

TABLE 3-1

| Reference Example No. | Graft product | Base rubber | | Feed ratio (parts by weight) | | Rubber content in graft product (% by weight) |
|---|---|---|---|---|---|---|
| | | | | Styrene | MMA | |
| 7 | G-EPM-8 | EPM-6 | 100 | 84 | 16 | 57.4 |
|   | G-EMP-9 | EPM-7 | 100 | 84 | 16 | 56.4 |
| 8 | G-EPM-10 | EPM-8 | 100 | 84 | 16 | 54.2 |
|   | G-EPM-11 | EPM-9 | 100 | 84 | 16 | 53.8 |
|   | G-EPM-12 | EPM-10 | 100 | 84 | 16 | 55.7 |

TABLE 3-1-continued

| Reference Example No. | Graft product | Base rubber | Feed ratio (parts by weight) Styrene | MMA | Rubber content in graft product (% by weight) |
|---|---|---|---|---|---|
| 9 | G-EBP-1 | EBP-1 | 100 | 84 | 16 | 53.2 |
|   | G-EBP-2 | EPB-2 | 100 | 84 | 16 | 54.2 |
|   | G-EBM-1 | EBM-1 | 100 | 84 | 16 | 56.3 |
| 10 | G-EPM-13 | EPM-5 | 100 | 84 | 16 | 53.0 |

TABLE 3-2

| Reference Example No. | Graft product | Base rubber | 1st step Styrene | 1st step AN | 2nd step Styrene | 2nd step AN | Rubber content in graft product (% by weight) |
|---|---|---|---|---|---|---|---|
| 12 | G-EPDM-14 | EPDM-1 | 100 | 95 | 5 | 124 | 6 | 31.7 |
|    | G-EPDM-15 | EPDM-1 | 100 | 87.9 | 12.1 | 114.2 | 15.8 | 32.5 |
|    | G-EPDM-16 | EPDM-1 | 100 | 75 | 40 | 85 | 30 | 31.0 |

TABLE 3-3

| Reference Example No. | Graft product | Base rubber | Feed ratio (parts by weight) Styrene | MMA | Rubber content in graft product (% by weight) |
|---|---|---|---|---|---|
| 13 | G-EBM-2 | EBM-2 | 100 | 56 | 10.7 | 62.1 |
| 14 | G-EPDM-17 | EPDM-1 | 100 | 56 | 10.7 | 64.8 |
|    | G-EPDM-18 | EPDM-1 | 100 | 84 | 16 | 55.1 |
|    | G-EPDM-19 | EPDM-1 | 100 | 126 | 34 | 46.9 |

Analysis of composition of graft product:

The results of the structure analysis of graft products by a solvent extraction analysis are shown in Tables 4 to 8. Also, the compositions of the graft products shown in Reference Examples 2 to 13 analyzed by NMR are shown in Tables 9 to 11.

TABLE 4

| Graft product | free-MS | free-EPM or EPDM | MS-g-EPM | THF gel (% by weight) |
|---|---|---|---|---|
| | | free-EPM | | |
| G-EPM-1 | 33.5 | 29.9 | 36.6 | 0.06 |
| G-EPM-2 | 26.4 | 31.1 | 42.5 | 0.24 |
| G-EPM-3 | 29.4 | 25.1 | 45.3 | 0.13 |
| G-EPM-4 | 32.1 | 26.9 | 41.0 | 2.3 |
| | | free-EPDM | | |
| G-EPDM-5 | 42.8 | 12.4 | 44.8 | 4.85 |
| G-EPDM-6 | 43.2 | 10.6 | 46.3 | 2.36 |
| G-EPDM-7 | 45.9 | 6.5 | 47.6 | 0.73 |
| G-DPDM-8 | 43.8 | 6.7 | 49.4 | 10.0 |
| G-EPDM-9 | 46.7 | 5.1 | 48.1 | 26.7 |

TABLE 5

| Graft product | free-MS | free-EPM | MS-g-EPM | THF gel (% by weight) | $[\eta]_{MS}$ (dl/g) |
|---|---|---|---|---|---|
| G-EPM-5 | 55.2 | 8.9 | 35.9 | 0.25 | 0.53 |
| G-EPM-6 | 53.8 | 9.1 | 37.1 | 0.05 | 0.51 |
| G-EPM-7 | 52.6 | 9.1 | 38.3 | 0.08 | 0.54 |
| G-EPM-8 | 22.7 | 31.9 | 45.4 | 0.09 | 0.41 |
| G-EPM-9 | 24.2 | 31.2 | 44.6 | 0.13 | 0.40 |
| G-EPM-10 | 25.8 | 19.8 | 54.4 | 6.56 | 0.32 |
| G-EPM-11 | 29.2 | 19.3 | 51.5 | 0.94 | 0.35 |

TABLE 5-continued

| Graft product | free-MS | free-EPM | MS-g-EPM | THF gel (% by weight) | $[\eta]_{MS}$ (dl/g) |
|---|---|---|---|---|---|
| G-EPM-12 | 3.10 | 14.6 | 54.4 | 11.6 | 0.33 |

TABLE 6

| Graft product | free-MS | free-EPM | MS-g-EPDM | THF gel (% by weight) | $[\eta]_{MS}$ (dl/g) |
|---|---|---|---|---|---|
| G-EPDM-10 | 43.7 | 12.9 | 43.4 | 0.91 | 0.48 |
| G-EPDM-11 | 45.4 | 13.3 | 41.3 | 2.25 | 0.48 |
| G-EPDM-12 | 43.8 | 11.9 | 44.4 | 0.64 | 0.47 |
| G-EPDM-13 | 43.7 | 12.4 | 43.9 | 0.72 | 0.49 |

TABLE 7

| Graft product | free-AS | free-EPDM | MS-g-EPDM | THF gel (% by weight) | $[\eta]_{AS}$ (dl/g) |
|---|---|---|---|---|---|
| G-EPDM-14 | 44.0 | 5.1 | 50.3 | 13.7 | 0.50 |
| G-EPDM-15 | 50.3 | 9.6 | 40.1 | 12.5 | 0.72 |
| G-EPDM-16 | 47.0 | 7.8 | 45.2 | 13.0 | 0.65 |

Note: AS means acrylonitrile-styrene copolymer.

TABLE 8

| Graft product | Constituent (% by weight) free-AS | free-EPDM | MS-g-EPDM | THF gel (% by weight) | $[\eta]_{MS}$ (dl/g) |
|---|---|---|---|---|---|
| G-EPDM-17 | 17.1 | 28.7 | 54.2 | 32.0 | 0.29 |
| G-EPDM-18 | 25.7 | 21.4 | 52.9 | 29.7 | 0.37 |
| G-EPDM-19 | 32.7 | 13.4 | 53.9 | 13.8 | 0.35 |

TABLE 9

| Reference Example No. | Graft product | Rubber | Composition (% by weight) Styrene | Comonomer | | Rubber |
|---|---|---|---|---|---|---|
| 2 | G-EPM-1 | EPM-1 | 37.5 | MMA | 7.2 | 55.3 |
|   | G-EPM-2 | EPM-2 | 36.5 | MMA | 7.0 | 56.5 |
|   | G-EMP-3 | EPM-3 | 40.6 | MMA | 7.7 | 51.7 |
|   | G-EPM-4 | EPM-4 | 39.4 | MMA | 7.5 | 53.1 |
| 3 | G-EPDM-1 | EPDM-1 | 39.7 | MMA | 7.6 | 52.7 |
|   | G-EPDM-2 | EPDM-2 | 40.2 | MMA | 7.6 | 52.2 |
|   | G-EPDM-3 | EPDM-3 | 35.7 | MMA | 6.8 | 57.5 |
|   | G-EPDM-4 | EPDM-4 | 36.2 | MMA | 6.9 | 56.9 |
| 4 | G-EPDM-5 | EPDM-1 | 67.5 | — | — | 32.5 |
|   | G-EPDM-6 | EPDM-1 | 64.6 | MMA | 3.5 | 31.9 |
|   | G-EPDM-7 | EPDM-1 | 57.6 | MMA | 11.0 | 31.4 |
|   | G-EPDM-8 | EPDM-1 | 55.5 | MMA | 13.3 | 31.2 |
| 5 | G-EPDM-9 | EPDM-1 | 41.6 | MMA | 27.7 | 30.7 |

TABLE 10

| Reference Example No. | Graft product | Rubber | Composition (% by weight) Styrene | Comonomer | | Rubber |
|---|---|---|---|---|---|---|
| 6 | G-EPM-5 | EPM-6 | 76.1 | — | — | 23.9 |
|   | G-EPM-6 | EPM-6 | 72.0 | MMA | 3.8 | 24.2 |
|   | G-EMP-7 | EPM-6 | 62.7 | MMA | 12.0 | 25.3 |
| 7 | G-EPM-8 | EPM-6 | 36.0 | MMA | 6.8 | 57.2 |
|   | G-EPM-9 | EPM-7 | 36.6 | MMA | 7.0 | 56.4 |
| 8 | G-EPM-10 | EPM-8 | 38.3 | MMA | 7.3 | 54.4 |
|   | G-EPM-11 | EPM-9 | 39.0 | MMA | 7.4 | 53.6 |
|   | G-EPM-12 | EPM-10 | 37.2 | MMA | 7.1 | 55.7 |
| 9 | G-EBP-1 | EPM-6/EBM-1 = 50/50 | 39.3 | MMA | 7.5 | 53.2 |
|   | G-EBP-2 | EPM-6/EBM-1 = 30/70 | 38.3 | MMA | 7.3 | 54.4 |
|   | G-EBM-1 | EBM-1 | 36.5 | MMA | 7.0 | 56.5 |
| 10 | G-EPM-13 | EPM-5 | 39.7 | MMA | 7.6 | 52.7 |

TABLE 11

| Reference Example No. | Graft product | Rubber | Composition (% by weight) Styrene | Comonomer | | Rubber |
|---|---|---|---|---|---|---|
| 11 | G-EPDM-10 | EPDM-1 | 64.1 | M1 | 3.4 | 32.5 |
|    | G-EPDM-11 | EPDM-1 | 65.1 | M2 | 3.4 | 31.5 |
|    | G-EMDP-12 | EPDM-1 | 65.5 | M3 | 3.4 | 31.1 |
|    | G-EPDM-13 | EPDM-1 | 64.9 | M4 | 3.4 | 31.7 |
| 12 | G-EPDM-14 | EPDM-1 | 65.2 | AN | 3.4 | 31.4 |
|    | G-EPDM-15 | EPDM-1 | 59.6 | AN | 8.1 | 32.3 |
|    | G-EPDM-16 | EPDM-1 | 51.1 | AN | 17.9 | 31.0 |
| 13 | G-EBM-2 | EBM-2 | 31.9 | MMA | 6.1 | 62.0 |
| 14 | G-EPDM-17 | EPDM-1 | 29.7 | MMA | 5.7 | 64.6 |

TABLE 11-continued

| Reference Example No. | Graft product | Rubber | Composition (% by weight) Styrene | Comonomer | | Rubber |
|---|---|---|---|---|---|---|
|    | G-EPDM-18 | EPDM-1 | 37.7 | MMA | 7.2 | 55.1 |
|    | G-EPDM-19 | EPDM-1 | 44.6 | MMA | 8.4 | 47.0 |

Note: M1, M2, M3 and M4 mean isodecyl methacrylate, stearyl methacrylate, isobornyl methacrylate and 2-ethylhexyl methacrylate, respectively.

EXAMPLE 1

In order to confirm the effect as the impact modifier of the graft product on the polyphenylene ether resin, the graft copolymer MS-g-EPM-1 extracted from the G-EPM-1 and a poly(2,6-dimethyl-1,4-phenylene)ether (referred to hereinafter as PPE-1) having an intrinsic viscosity of 0.46 dl/g as measured at 30° C. in chloroform were blended in the proportions shown in Table 12 so that the rubber content of the total composition became 13% by weight. Kneading was conducted by means of a laboplastomill under the conditions mentioned in the paragraph "Method of fractionation of graft product" except that the temperature was 280° C., and the thermoplastic resin composition obtained was press-molded at 280° C. to prepare a test piece which was subjected to evaluation of physical properties. The results of measurement of physical properties are shown in Table 12.

TABLE 12

|  | Blending ratio | Physical properties | |
|---|---|---|---|
|  | (% by weight) PPE-1/MS-g-EPM-1 | Izod 23° C. (kg · cm/cm) | FWI 23° C./−30° C. (kg · cm) |
| Example 1 | 81.4/18.6 | 56.5 | 530/350 |

EXAMPLES 2 and 3

With 40 parts by weight of PPE-1 was blended the graft products G-EPM-1 and G-EPM-3 and polystyrene (8K Beads manufactured by Nippon Polystyrene K. K., referred to hereinafter as PS-1) in the proportions shown in Table 13 so that the rubber content of the composition became 13% by weight, and kneading was conducted in the same manner as in Example 1. The composition obtained was injection-molded at a temperature of about 310° C. at a die temperature of about 80° C. to prepare a test piece.

The test piece was subjected to evaluation of physical properties to obtain the results shown in Table 13.

Comparative Examples 1 and 2

In the same manner as in Examples 2 and 3, except that the graft products G-EPM-2 and G-EPM-4 were used, the components were blended so that the rubber content of the composition became 13% by weight (see Table 13) and molded. The results of evaluation of physical properties are shown in Table 13.

TABLE 13

| | Blending ratio (% by weight) | | | Physical properties | | |
|---|---|---|---|---|---|---|
| | PPE-1 | Graft product | PS-1 | Izod 23° C. (kg·cm/cm) | FWI 23° C./ −30° C. (kg·cm) | HDT (°C.) |
| Example 2 | 40 | G-EPM-1 23.4 | 36.6 | 35.5 | 383/240 | 122 |
| Example 3 | 40 | G-EPM-3 25.0 | 35.0 | 35.5 | 405/200 | 123 |
| Comp. Example 1 | 40 | G-EPM-2 22.9 | 37.1 | 30.5 | 263/158 | 124 |
| Comp. Example 2 | 40 | G-EPM-4 24.5 | 35.5 | 26.6 | 263/83 | 122 |

Examples 4, 5 and 6

In the same manner as in Example 2, the graft product II obtained in Reference Example 3 was blended so that the rubber content of the composition became 13% by weight (see Table 14) and the composition was molded. The results of evaluation of physical properties are shown in Table 14.

Comparative Example 3

In the same manner as in Examples 4, 5 and 6, except that EPDM-4 having a broad molecular weight distribution (Q value=4.4) was used as the base rubber, the components were blended so that the rubber content of the composition became 13% by weight (see Table 14) and the composition was molded. The results of evaluation of physical properties are shown in Table 14.

TABLE 14

| | Blending ratio (% by weight) | | | Physical properties | |
|---|---|---|---|---|---|
| | PPE-1 | Graft product | PS-1 | Izod 23° C. (kg·cm/cm) | FWI 23° C./ −30° C. (kg·cm) |
| Example 4 | 40 | G-EPDM-1 24.8 | 35.2 | 36.0 | 435/375 |
| Example 5 | 40 | G-EPDM-2 25.0 | 35.0 | 34.2 | 383/278 |
| Example 6 | 40 | G-EPDM-3 22.7 | 37.3 | 37.3 | 353/248 |
| Comp. Example 3 | 40 | G-EPDM-4 22.8 | 37.2 | 35.8 | 290/165 |

EXAMPLES 7, 8, 9 and 10

The components shown in Table 15 were blended with a poly(2,6-dimethyl-1,4-phenylene)ether having an intrinsic viscosity of 0.40 dl/g as measured at 30° C. in chloroform (referred to hereinafter as PPE-2), and the composition obtained was molded in the same manner as in Example 6. The results of evaluation of physical properties are shown in Table 15.

Comparative Example 4

In the same manner as in Example 7, the graft product IV obtained in Reference Example 5 was blended with the other components shown in Table 15 so that the rubber content of the composition became 13% by weight (see Table 15), and the composition obtained was molded. The results of evaluation of physical properties are shown in Table 15.

TABLE 15

| | Graft product | Blending ratio (% by weight) PPE-2/ Graft product | Physical properties | | |
|---|---|---|---|---|---|
| | | | Izod 23° C. (kg·cm/cm) | FWI 23° C./ −30° C. kg·cm | HDT (°C.) |
| Example 7 | G-EPDM-5 | 68.9/31.1 | 40.6 | 380/240 | 152 |
| Example 8 | G-EPDM-6 | 68.9/31.1 | 39.7 | 400/250 | 154 |
| Example 9 | G-EPDM-7 | 68.9/31.1 | 36.8 | 380/240 | 150 |
| Example 10 | G-EPDM-8 | 68.9/31.1 | 35.3 | 350/200 | 151 |
| Comparative Example 4 | G-EPDM-9 | 68.9/31.1 | 22.0 | 200/80 | 160 |

EXAMPLES 11, 12 and 13

In the same manner as in Example 10, the graft product V obtained in Reference Example 6 was blended with the other components shown in Table 16 so that the rubber content in the composition became 13% by weight (see Table 16), and the resulting composition was molded. The results of evaluation of physical properties are shown in Table 16.

TABLE 16

| | Graft product | Blending ratio (% by weight) PPE-1/ G-EPM/ PS | Physical properties | | |
|---|---|---|---|---|---|
| | | | Izod 23° C. (kg·cm/ cm) | FWI 23° C./ −30° C. kg·cm | HDT (°C.) |
| Example 11 | G-EPM-5 | 35/65/0 | 24.8 | 345/235 | 115 |
| Example 12 | G-EPM-6 | 35/63.6/ 1.4 | 44.8 | 338/220 | 114 |
| Example 13 | G-EPM-7 | 35/61.4/ 3.6 | 40.0 | 310/200 | 111 |

EXAMPLES 14 and 15

In the same manner as in Example 3, the graft produce VI obtained in Reference Example 7 was blended with the other components in the proportions shown in Table 17, and the composition was kneaded and molded in the same manner as in Example 3. The results of evaluation of physical properties are shown in Table 17.

TABLE 17

| | Graft product | Blending ratio (% by weight) PPE-1/ G-EPM/ PS | Izod 23° C. (kg · cm/ cm) | FWI 23° C./ −30° C. kg · cm | HDT (°C.) |
|---|---|---|---|---|---|
| Example 14 | G-EPM-8 | 40/26.8/ 33.2 | 37.0 | 368/293 | 124 |
| Example 15 | G-EPM-9 | 40/27.3/ 32.7 | 29.2 | 353/248 | 125 |

EXAMPLES 16, 17 and 18

The graft product VII obtained in Reference Example 8 was blended with the other components in the proportions shown in Table 18, and the resulting composition was kneaded, molded and subjected to evaluation of physical properties in the same manner as in Example 14. The results of evaluation of physical properties are shown in Table 18.

TABLE 18

| | Graft product | Blending ratio (% by weight) PPE-1/ G-EPM/ PS | Izod 23° C. (kg · cm/ cm) | FWI 23° C./ −30° C. kg · cm | HDT (°C.) |
|---|---|---|---|---|---|
| Example 16 | G-EPM-10 | 40/28.4/ 31.6 | 15.9 | 303/113 | 123 |
| Example 17 | G-EPM-11 | 40/28.6/ 31.4 | 19.1 | 325/105 | 124 |
| Example 18 | G-EPM-12 | 40/27.6/ 32.4 | 20.3 | 303/143 | 124 |

EXAMPLES 19, 20 and 21

PPE-1 and PS-1 were blended with G-EBP-1 or G-EBP-2 in the proportions shown in Table 19 so that the rubber content of the composition became 13% by weight, and the composition obtained was kneaded, molded and subjected to evaluation of physical properties in the same manner as in Example 16 to obtain the results shown in Table 19.

TABLE 19

| | Graft product | Blending ratio (% by weight) PPE-1/ Graft product/ PS-1 | Izod 23° C. (kg · cm/ cm) | FWI 23° C./ −30° C. kg · cm | HDT (°C.) |
|---|---|---|---|---|---|
| Example 19 | G-EBP-1 | 40/24.4/ 39.1 | 37 | 360/280 | 124 |
| Example 20 | G-EBP-2 | 40/23.9/ 38.7 | 33 | 360/250 | 123 |
| Example 21 | G-EBM-1 | 40/23.1/ 36.9 | 30 | 340/200 | 123 |

Comparative Example 5

G-EPM-13 was blended with the other components in the proportions shown in Table 20 so that the rubber content of the composition became 13% by weight, and the resulting composition was kneaded, molded and subjected to evaluation of physical properties to obtain the results shown in Table 20.

TABLE 20

| | Graft product | Blending ratio (% by weight) PPE-1/ G-EPM-13/ PS-1 | Izod 23° C. (kg · cm/ cm) | FWI 23° C./ −30° C. kg · cm | HDT (°C.) |
|---|---|---|---|---|---|
| Comparative Example 5 | G-EPM-13 | 40/24.5/ 35.5 | 27.0 | 270/120 | 123 |

EXAMPLES 22, 23, 24 and 25

In the same manner as in Example 8, except that G-EPDM-10, G-EPDM-11, G-EPDM-12 and G-EPDM-13 were used, blending, kneading and evaluation of physical properties were conducted to obtain the results shown in Table 21.

TABLE 21

| | Graft product | Blending ratio (% by weight) PPE-2/ Graft product | Izod 23° C. (kg · cm/ cm) | FWI 23° C./ −30° C. kg · cm | HDT (°C.) |
|---|---|---|---|---|---|
| Example 22 | G-EPDM-10 | 68.9/31.1 | 37.0 | 390/250 | 150 |
| Example 23 | G-EPDM-11 | 68.9/31.1 | 38.2 | 400/260 | 150 |
| Example 24 | G-EPDM-12 | 68.9/31.1 | 36.6 | 380/250 | 152 |
| Example 25 | G-EPDM-13 | 68.9/31.1 | 37.7 | 395/255 | 149 |

EXAMPLES 26, 27

Comparative Example 6

In the same manner as in Examples 7 to 10, except that the graft products G-EPDM-14, G-EPDM-15 and G-EPDM-16 were used, blending, kneading and evaluation of physical properties were conducted. The blending proportions and physical properties are shown in Table 22.

TABLE 22

| | Graft product | Blending ratio (% by weight) PPE-2/ Graft product | Izod 23° C. (kg · cm/ cm) | FWI 23° C./ −30° C. kg · cm | HDT (°C.) |
|---|---|---|---|---|---|
| Example 26 | G-EPDM-14 | 68.9/31.1 | 33.2 | 390/250 | 151 |
| Example 27 | G-EPDM-15 | 68.9/31.1 | 31.4 | 370/230 | 160 |

TABLE 22-continued

| | Graft product | Blending ratio (% by weight) PPE-2/ Graft product | Physical properties | | |
|---|---|---|---|---|---|
| | | | Izod 23° C. (kg · cm/ cm) | FWI 23° C./ −30° C. kg · cm | HDT (°C.) |
| Comparative Example 6 | G-EPDM-16 | 68.9/31.1 | 7.7 | 120/45 | 150 |

EXAMPLES 28, 29 and 30

In the same manner as in Examples 7 to 10, except that the G-EPDM-7 obtained in Reference Example 4, PPE-1 and PS-1 were blended as shown in Table 23, kneading and evaluation of physical properties were conducted to obtain the results shown in Table 23.

TABLE 23

| | Blending ratio (% by weight) PPE-1/G-EPDM-7/PS-1 | Physical properties | | |
|---|---|---|---|---|
| | | Izod 23° C. (kg · cm/ cm) | FWI 23° C./ −30° C. (kg · cm) | HDT (°C.) |
| Example 28 | 52.2/43.3/4.5 | 37.0 | 460/400 | 130 |
| Example 29 | 34.8/43.3/21.9 | 36.3 | 420/380 | 110 |
| Example 30 | 17.4/43.3/39.3 | 33.6 | 330/250 | 103 |

EXAMPLES 31 and 32

In the same manner as in Examples 7 to 10, except that the G-EPDM-7 obtained in Reference Example 4, PPE-1, PS-1 and a hydrogenated styrene-butadiene-styrene block copolymer [KRATON (registered trademark) G16151 manufactured by Shell Chemical] or a styrene-butadiene-styrene block copolymer [Cariflex (registered trademark) TR1101 manufactured by Shell Chemical] were blended in the proportions shown in Table 24, kneading and evaluation of physical properties were conducted to obtain the results shown in Table 24.

TABLE 24

| | Block copolymer | Blending ratio (% by weight) PPE-1/ G-EPDM-7/ Block copolymer/ PS-1 | Physical properties | | |
|---|---|---|---|---|---|
| | | | Izod 23° C. | FWI 23° C./ −30° C. (kg · cm) | HDT (°C.) |
| Example 31 | G1651 | 52.2/21.7/9.7/ 16.4 | 30.0 | 430/380 | 132 |
| Example 32 | TR1101 | 52.2/21.7/9.7/ 16.4 | 24.0 | 350/270 | 123 |

EXAMPLES 33, 34, 35 and 36

In the same manner as in Examples 7 to 10, except that the G-EPDM-7 obtained in Reference Example 4, PPE-1, PS-1 and a rubber modified polystyrene Esbrite (registered trademark) 500SX manufactured by Nippon Polystyrene or Sumibrite (registered trademark) E580, M584 or TL3000 manufactured by Sumitomo Chemical Co., Ltd.] were blended in the proportions shown in Table 25, kneading and evaluation of physical properties were conducted to obtain the results shown in Table 25.

TABLE 25

| | Rubber-modified polystyrene | Blending ratio (% by weight) PPE-1/ G-EPDM-7/ Rubber-modified polystyrene/ PS-1 | Physical properties | | |
|---|---|---|---|---|---|
| | | | Izod 23° C. | FWI 23° C./ −30° C. (kg · cm) | HDT (°C.) |
| Example 33 | 500SX | 52.2/34.7/ 11.3/1.8 | 32 | 330/250 | 132 |
| Example 34 | E580 | 52.2/34.7/ 11.3/1.8 | 34 | 400/370 | 132 |
| Example 35 | M584 | 52.2/34.7/ 11.3/1.8 | 35 | 430/380 | 131 |
| Example 36 | TL3000 | 52.2/34.7/ 11.3/1.8 | 37 | 460/400 | 131 |

EXAMPLES 37

In the same manner as in Example 28, except that the PS-5 was replaced with Estyrene (registered trademark) MS-200 manufactured by Nippon Steel Chemical Co., Ltd., blending, kneading and evaluation of physical properties were conducted to obtain the results shown in Table 26.

TABLE 26

| | Blending ratio (% by weight) PPE-1/G-EPDM-7/MS-200 | Physical properties | | |
|---|---|---|---|---|
| | | Izod 23° C. | FWI 23° C./−30° C. (kg · cm) | HDT (°C.) |
| Example 37 | 52.2/43.3/4.5 | 37.0 | 460/400 | 130 |

EXAMPLES 38 to 40

In the same manner as in Examples 4 to 6, except that G-EPDM-17, G-EPDM-18 or G-EPDM-19, PPE-1 and PS-1 were blended in the proportions shown in Table 27 so that the rubber content in the composition became 7% by weight, kneading and evaluation of physical properties were conducted to obtain the results shown in Table 27.

TABLE 27

| | Graft product | Blending ratio (% by weight) PPE-1/ Graft product/ PS-1 | Physical properties | | |
|---|---|---|---|---|---|
| | | | Izod 23° C. | FWI 23° C./ −30° C. kg · cm | HDT (°C.) |
| Example 38 | G-EPDM-17 | 42.8/10.8/ 46.4 | 8.5 | 130/110 | 127 |
| Example 39 | G-EPDM-18 | 42.8/12.7/ 44.5 | 11.1 | 160/130 | 127 |
| Example 40 | G-EPDM-19 | 42.8/14.9/ 42.3 | 13.1 | 185/150 | 126 |

Comparative Example 7

In the same manner as in Examples 19 to 21, except that PPE-1, G-EBM-2 and PS-1 were blended in the proportions shown in Table 28 so that the rubber content in the composition became 13% by weight, kneading and evaluation of physical properties were conducted to obtain the results shown in Table 28.

TABLE 28

| | Blending ratio (% by weight) | Physical properties | | |
|---|---|---|---|---|
| | PPE-1/ G-EBM-2/ PS-1 | Izod 23° C. | FWI 23° C./–30° C. (kg · cm) | HDT (°C.) |
| Comparative Example 7 | 40/21.3/38.7 | 11.5 | 120/45 | 123 |

EXAMPLES 41, 42 and 43

In the same manner as in Example 19, except that Alumina A11 and/or BK112 manufactured by Sumitomo Chemical Co., Ltd. was blended in the amounts shown in Table 29 with 100 parts by weight of the blend obtained in Example 19, kneading and evaluation of physical properties were conducted to obtain the results shown in Table 29.

TABLE 29

| | Blending ratio (% by weight) | Physical properties | | |
|---|---|---|---|---|
| | PPE-2/ G-EBM-7/ A11/BK112 | Izod 23° C. | FWI 23° C./–30° C. (kg · cm) | HDT (°C.) |
| Example 41 | 68.9/31.1/2/— | 34.7 | 365/225 | 152 |
| Example 42 | 68.9/31.1/—/2 | 35.8 | 375/235 | 152 |
| Example 43 | 68.9/31.1/1/1 | 35.5 | 370/230 | 152 |

What is claimed is:

1. A thermoplastic resin composition which comprises a blend of: 95 parts by weight of a mixture of:

(A) 1 to 100% by weight of a polyphenylene ether resin and (B) 0 to 99% by weight of an alkenyl aromatic resin, with (C) 5 to 95 parts by weight of a graft copolymer obtained by graft-copolymerizing (a) an alkenyl aromatic compound, and optionally, (b) another unsaturated monomer onto (c) an ethylene-α-olefin copolymer rubber having a ratio (Q value) of weight average molecular weight/number average molecular weight as measured by GPC of 4.0 or less and having a Mooney viscosity at 121° C. of more than 40, in which graft copolymer the weight ratio of (a) the alkenyl aromatic compound/(b) the other unsaturated monomer/(c) the ethylene-α-olefin copolymer rubber is 20–80/up to 18.4/80–20 (the total of the component (a) and the component (c) is 100 parts by weight) and the weight ratio of the component (b)/(the component (a)+the component (b)) is 0.23 or less, wherein said unsaturated monomer (b) is selected from an unsaturated carboxylic acid, an unsaturated dicarboxylic acid and an ester, an anhydride, an amide, a nitrile and an imide thereof, and wherein the amounts of said polyphenylene ether resin (A) and said alkenyl aromatic resin (B) are based on 100% by weight of (A) and (B), and the amounts of said mixture ((A)+(B)) and said graft copolymer (C) are based on 100 parts by weight of (A), (B) and (C).

2. The thermoplastic resin composition according to claim 1, wherein (D) a rubbery material is further contained in an amount of 0.1 to 50 parts by weight per 100 parts by weight of the composition.

3. The thermoplastic resin composition according to claim 1, wherein the polyphenylene ether resin (A) is poly(2,6-dimethyl-1,4-phenylene)ether.

4. The thermoplastic resin composition according to claim 1, wherein the alkenyl aromatic resin (B) is at least one member selected from the group consisting of styrene-alkyl (meth)acrylate copolymer having a styrene content of 78% by weight or more, styrene-acrylonitrile copolymer having a styrene content of 78% by weight or more, polystyrene, polybutadiene-modified polystyrene and styrene-butadiene-rubber modified polystyrene.

5. The thermoplastic resin composition according to claim 1, wherein in the graft copolymer (C), the alkenyl aromatic compound (a) is styrene, the unsaturated monomer (b) is at least one member selected from the group consisting of alkyl (meth)acrylate and acrylonitrile, and the ethylene-α-olefin copolymer rubber (c) is at least one member selected from the group consisting of ethylene-α-olefin copolymer rubber having a crystallinity of less than 15% and ethylene-α-olefin-non-conjugated diene copolymer rubber having a crystallinity of less than 15%.

6. The thermoplastic resin composition according to claim 2, wherein the rubbery material (D) is at least one member selected from the group consisting of ethylene-α-olefin copolymer rubber having a crystallinity of less than 15%, ethylene-α-olefin-non-conjugated copolymer rubber, styrene-butadiene diblock or more block copolymer rubber, styrene-isoprene diblock or more block copolymer rubber, hydrogenated styrene-butadiene diblock or more block copolymer rubber and hydrogenated styrene-isoprene diblock or more block copolymer rubber.

* * * * *